US010411837B1

United States Patent
Zhang et al.

(10) Patent No.: US 10,411,837 B1
(45) Date of Patent: Sep. 10, 2019

(54) SYSTEMS AND METHODS FOR A MULTIPLE-INPUT-MULTIPLE-OUTPUT (MIMO) DATA TRANSMISSION SCHEME USING A SPACE TIME BLOCK CODE (STBC)

(71) Applicant: Marvell International Ltd., Hamilton (BM)

(72) Inventors: Hongyuan Zhang, Fremont, CA (US); Rui Cao, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/601,080

(22) Filed: May 22, 2017

Related U.S. Application Data

(63) Continuation of application No. 15/052,421, filed on Feb. 24, 2016, now Pat. No. 9,692,559.

(60) Provisional application No. 62/119,933, filed on Feb. 24, 2015.

(51) Int. Cl.
| | |
|---|---|
| *H04L 1/06* | (2006.01) |
| *H04L 5/00* | (2006.01) |
| *H04B 7/04* | (2017.01) |
| *H04L 1/00* | (2006.01) |
| *H04B 7/0456* | (2017.01) |

(52) U.S. Cl.
CPC ......... *H04L 1/0643* (2013.01); *H04B 7/0465* (2013.01); *H04B 7/0486* (2013.01); *H04L 1/0057* (2013.01); *H04L 5/0023* (2013.01)

(58) Field of Classification Search
CPC ... H04L 1/0618; H04L 1/0643; H04L 1/0668; H04L 1/0008; H04L 5/0025; H04L 27/2605; H04L 1/0057; H04B 7/0891
See application file for complete search history.

(56) References Cited

U.S. PATENT DOCUMENTS

| | | | |
|---|---|---|---|
| 7,561,632 B1 * | 7/2009 | van Zelst | H04B 7/0434 375/267 |
| 2005/0041751 A1 | 2/2005 | Nir et al. | |
| 2006/0039500 A1 | 2/2006 | Yun et al. | |
| 2006/0176993 A1 * | 8/2006 | Kwun | H04B 7/0417 375/367 |

(Continued)

OTHER PUBLICATIONS

Sumei Sun, Chin Keong Ho, Patrick Fung, Yuan Li, Yan Wu, Zhongding Lei, Woon Hau Chin, Ying-Chang Liang, Francois Chin, IEEE 802 doc: 11-04-0875-01-000n, Institute for Infocomm Research, IEEE P802.11 Wireless LANs, TGn MIMO-OFDM PHY Partial Proposal-Specifications, Aug. 2004.*

*Primary Examiner* — Aristocratis Fotakis

(57) ABSTRACT

Systems and methods described herein provide a system for transmitting data on an MIMO channel using a STBC. The system comprises a wireless transmitter. The wireless transmitter obtains plurality of data symbols to transmit, and performs data padding for the plurality of data symbols based on a non-STBC manner. The wireless transmitter further calculates a number of bits per data symbol after the data padding and pre-codes a data symbol from the plurality of data symbols based on available channel information when the number of data symbols is an odd number. The wireless transmitter generates an STBC based on the pre-coded data symbols, and transmits the generated STBC to the MIMO channel.

20 Claims, 4 Drawing Sheets

(56) References Cited

U.S. PATENT DOCUMENTS

| | | | |
|---|---|---|---|
| 2006/0251193 A1* | 11/2006 | Kopmeiners | H04B 7/0684 |
| | | | 375/345 |
| 2007/0291638 A1 | 12/2007 | Chae et al. | |
| 2010/0100795 A1* | 4/2010 | Yuan | H04L 1/0041 |
| | | | 714/776 |
| 2011/0188518 A1* | 8/2011 | Kenney | H04L 1/0041 |
| | | | 370/476 |
| 2011/0249660 A1* | 10/2011 | Noh | H04L 5/0023 |
| | | | 370/338 |
| 2013/0177004 A1* | 7/2013 | Srinivasa | H04L 5/0091 |
| | | | 370/338 |
| 2013/0279379 A1 | 10/2013 | Yang et al. | |
| 2014/0126659 A1 | 5/2014 | Srinivasa et al. | |
| 2014/0269770 A1 | 9/2014 | Kenney et al. | |
| 2015/0365263 A1 | 12/2015 | Zhang et al. | |
| 2016/0056930 A1* | 2/2016 | Seok | H04L 5/0026 |
| | | | 370/330 |
| 2016/0057657 A1* | 2/2016 | Seok | H04L 69/324 |
| | | | 370/476 |
| 2016/0088641 A1* | 3/2016 | Kwon | H04W 72/085 |
| | | | 370/329 |
| 2016/0227437 A1 | 8/2016 | Blanksby et al. | |

* cited by examiner

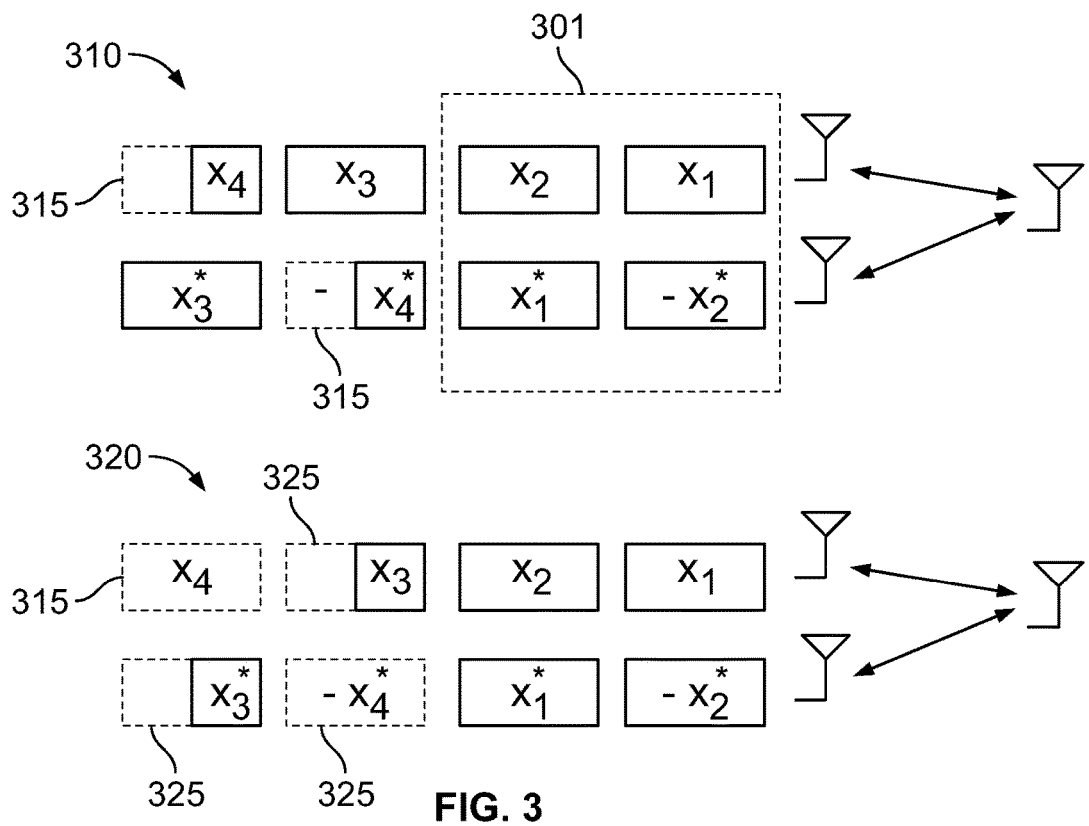
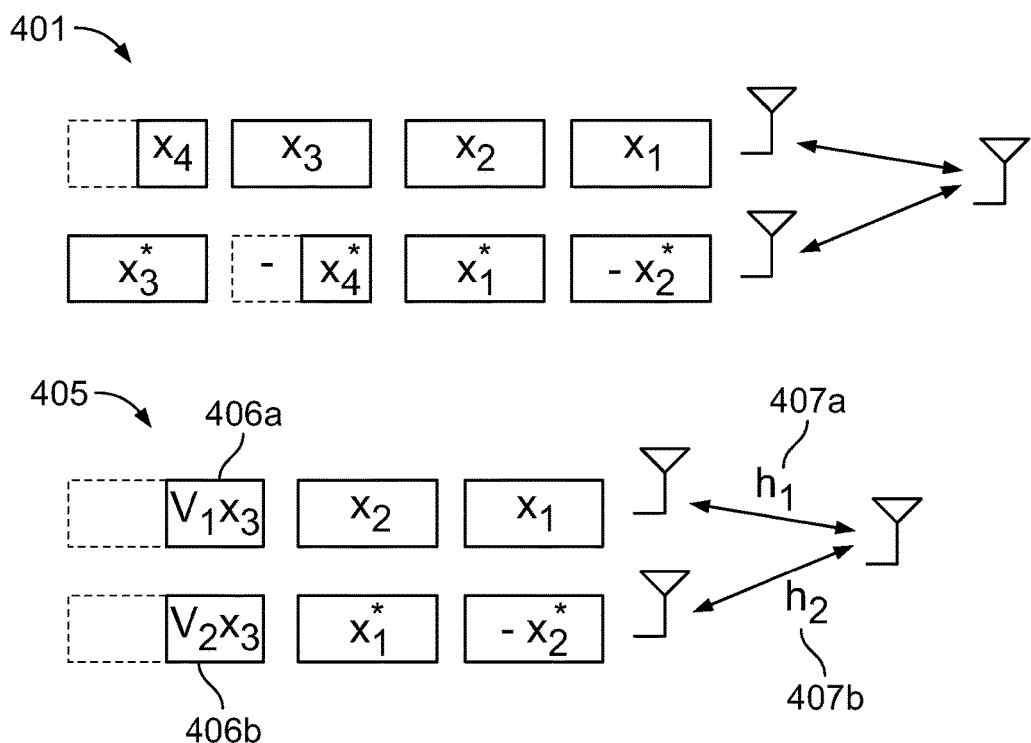
FIG. 3
FIG. 4

“SYSTEMS AND METHODS FOR A MULTIPLE-INPUT-MULTIPLE-OUTPUT (MIMO) DATA TRANSMISSION SCHEME USING A SPACE TIME BLOCK CODE (STBC)”

CROSS-REFERENCE TO RELATED APPLICATION

This disclosure is a continuation of and claims priority to U.S. Non-Provisional application Ser. No. 15/052,421, filed Feb. 24, 2016 (now allowed), which in turn claims the benefit of U.S. Provisional Patent Application No. 62/119,933, filed Feb. 24, 2015. The aforementioned applications are hereby incorporated by reference herein in their entireties.

FIELD OF USE

This disclosure relates to a channel coding scheme in a multiple-input-multiple-output (MIMO) wireless data transmission system, for example, a wireless local area network (WLAN) implementing the Institute of Electrical and Electronics Engineers (IEEE) 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Multiple-input and multiple-output (MIMO) transmission can be adopted in a wireless local area network. By using multiple transmit and receive antennas to transmit data symbols, MIMO multiplies the capacity of a radio link to exploit multipath propagation. MIMO has become an essential element of wireless communication standards including IEEE 802.11n (Wi-Fi), IEEE 802.11ac (Wi-Fi), HSPA+ (3G), WiMAX (4G), and Long Term Evolution (4G).

In a MIMO system, an encoding scheme such as the space-time block code (STBC) can be used to transmit multiple copies of a data stream across the multiple antennas at the transmitter. For example, an STBC can take a form similar to a matrix having data entries of data symbols. A same data symbol can occupy multiple data entries in an STBC matrix such that the same data symbol can be received in various versions to improve the reliability of data transfer.

SUMMARY

Systems and methods described herein provide a method for transmitting data on a multiple-input-multiple-output (MIMO) channel using a space time block code (STBC). The method comprises obtaining, at a wireless transmitter, a plurality of data symbols to transmit. The method further comprises performing data padding for the plurality of data symbols based on a non-STBC manner. The method further comprises calculating a number of bits per data symbol after the data padding. The method further comprises pre-coding a data symbol from the plurality of data symbols when the number of data symbols is an odd number. The method further comprises generating an STBC based on the pre-coded data symbols. The method further comprises transmitting the generated STBC to the MIMO channel.

In some implementations, the plurality of data symbols have an orthogonal frequency-divisional multiplexing (OFDM) data format.

In some implementations, the STBC takes a form of a matrix that have data entries of one or more data symbols and the conjugates of the one or more data symbols.

In some implementations, an average number of the data padding is half symbol.

In some implementations, a last padding data symbol from the data padding is transmitted using one symbol time.

In some implementations, the pre-coding includes applying a pre-coding matrix to the plurality of data symbols depending on availability of channel information.

In some implementations, the pre-coding matrix indicates that a last padding data symbol is transmitted using one antenna at the wireless transmitter.

In some implementations, the transmission power is normalized based on a number of utilized antennas at the wireless transmitter.

In some implementations, the pre-coding matrix is pre-determined and known by both the wireless transmitter and a respective wireless receiver.

In some implementations, the pre-coding matrix indicates that a last padding data symbol is transmitted through multiple antennas at the wireless transmitter.

Systems and methods described herein provide a system for transmitting data on an MIMO channel using a STBC. The system comprises a wireless transmitter. The wireless transmitter obtains plurality of data symbols to transmit, and performs data padding for the plurality of data symbols based on a non-STBC manner. The wireless transmitter further calculates a number of bits per data symbol after the data padding and pre-codes a data symbol from the plurality of data symbols based on available channel information when the number of data symbols is an odd number. The wireless transmitter generates an STBC based on the pre-coded data symbols, and transmits the generated STBC to the MIMO channel.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which:

FIG. 3 provides an exemplary block diagram illustrating an example STBC transmission scheme in a MIMO system.

FIG. 4 provides an exemplary block diagram illustrating an example STBC transmission scheme pre-coded with available channel information (e.g., from the MIMO channel 105 in FIG. 1).

DETAILED DESCRIPTION

This disclosure describes methods and systems for a MIMO data transmission scheme using an STBC. According to this disclosure, a new STBC padding and transmission procedure is adopted if the number of data symbols is odd, in which the first even number of data symbols are encoded with an STBC scheme and the last data symbol is specially encoded with and without available channel information. In this way, transmission efficiency of the data symbols can be improved.

Figure 1:
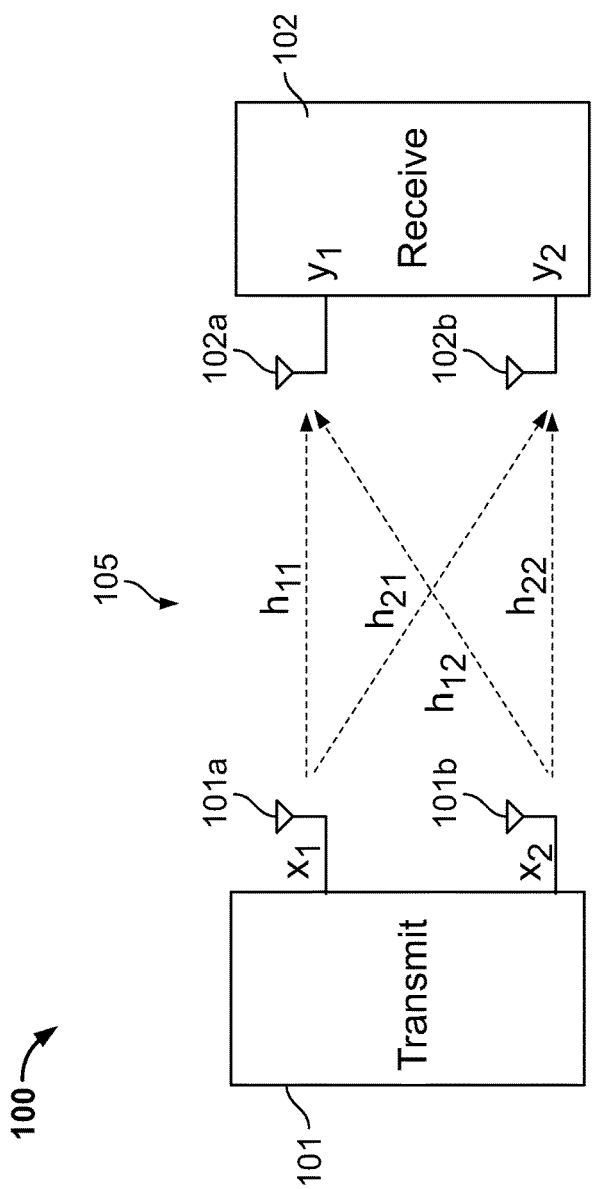
FIG. 1 provides an exemplary block diagram illustrating an example MIMO system.

FIG. 1 provides an exemplary block diagram illustrating an example MIMO system. The wireless transmission system 100 includes a transmitter module 101 and receiver module 102. The transmitter module 101 may have one or multiple antennas, e.g., antennas 101a-b for illustrative purpose. Similarly, the receiver module 102 may have one or multiple antennas, e.g., antennas 102a-b for illustrative purpose. The transmitter antennas 101a-b may transmit data symbols via a wireless channel 105 to the receiver antennas 102a-b, and the channel parameters can be represented as $h_{11}$, $h_{12}$, $h_{21}$ and $h_{22}$. Therefore, the MIMO system 100 can be represented as:

$$y = \begin{bmatrix} y_1 \\ y_2 \end{bmatrix} = \begin{bmatrix} h_{11} & h_{21} \\ h_{12} & h_{22} \end{bmatrix} \begin{bmatrix} x_1 \\ x_2 \end{bmatrix} + \begin{bmatrix} n_1 \\ n_2 \end{bmatrix} = Hx + n$$

where y denotes the received data vector, and x denotes the sent data vector; H denotes the channel matrix, and n denotes the channel noise vector.

Figure 2:
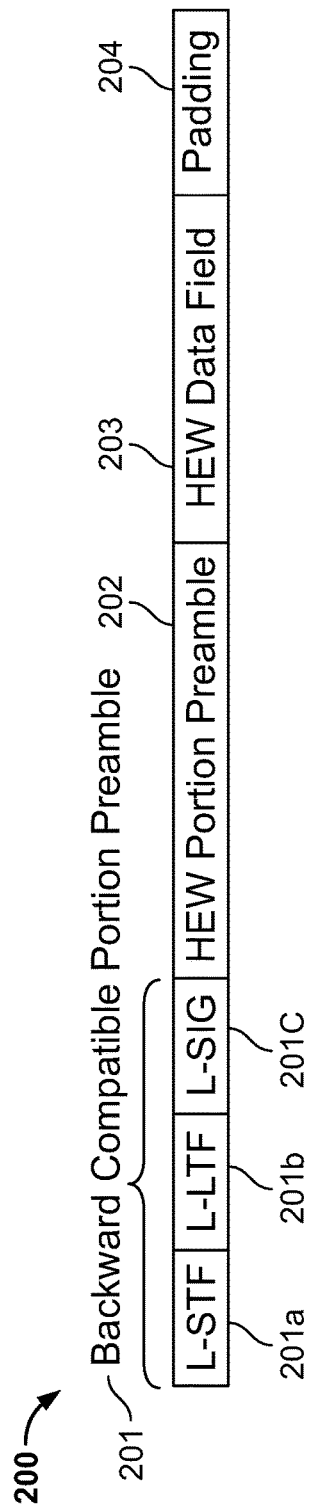
FIG. 2 provides an exemplary block diagram illustrating an example orthogonal frequency-division multiplexing (OFDM) format in the IEEE 802.11ax standards.

FIG. 2 provides an exemplary block diagram illustrating an example orthogonal frequency-division multiplexing (OFDM) format in the IEEE 802.11ax standards. To improve the transmission efficiency, tone spacing (TS) is adopted in 802.11ax high efficiency WLAN (HEW). In HEW, a variety of options of OFDM formats can be adopted, and padding symbol(s) may be added. For example, as shown at the data packet format 200, the example OFDM packet may have a backward compatible portion preamble 201, including the legacy short-training field 201a (L-STF), the legacy long-training field 201b (L-LTF) and legacy signal 201c (L-SIG). The data packet 200 may further include an HEW portion preamble 202, an HEW data field 203, and data symbol padding 204.

HEW data symbol may adopt various tone spacing (TS) and/or guard intervals (GI), and each HEW symbol time can be computed as:

$$T_{HEW} = 3.6 \text{ us}/r_{TS} + GI$$

wherein $r_{TS}$ is the tone spacing ratio with respect to current transmission frequency of 312.5 kHz. Different options can be used, for example, a ¼ tone spacing and GI option [0.4 us 0.8 us 1.6 us, 3.2 us], with a corresponding new symbol time: $T_{HEW}$=[14.8 us 15.2 us 16 us 17.6 us]. Alternatively, a ½ tone spacing and GI options [0.4 us 0.8 us 1.6 us] with a corresponding new symbol time $T_{HEW}$=[7.6 us 8.0 us 8.8 us]. Or a normal tone spacing and GI option [0.4 us 0.8 us 1.6 us] with a corresponding new symbol time $T_{HEW}$=[3.6 us 4.0 us 4.8 us].

The padding bit number $N_{PAD}$ can be computed in 802.11ac. For example, for binary convolutional coding (BCC), the bit number per data symbol $N_{SYM}$ and the padding bit number $N_{PAD}$ can be calculated according to the following:

$$N_{SYM} = m_{STBC} \left\lceil \frac{8 \cdot L + N_{Service} + N_{Tail}N_{Es}}{m_{STBC}N_{DBPS}} \right\rceil$$

$$N_{PAD} = N_{SYM}N_{DBPS} - 8 \cdot L - N_{Service} - N_{Tail}N_{Es}$$

wherein L is the number of information bytes to be transmitted in a current packet; $m_{STBC}$ equals 2 when STBC is used, or 1 otherwise; $N_{Service}$ is the number of service bits; $N_{Tail}$ is the number of tail bits; $N_{Es}$ is the number of BCC encoders for the DATA field; and $N_{DBPS}$ is the number of data bits per OFDM symbol.

For another example, for low-density parity-check (LDPC) coding, the bit number per data symbol $N_{SYM}$ and the padding bit number $N_{PAD}$ can be calculated according to the following:

$$N_{SYM} = m_{STBC} \left\lceil \frac{8 \cdot L + N_{Service}}{m_{STBC}N_{DBPS}} \right\rceil$$

$$N_{PAD} = N_{SYM}N_{DBPS} - 8 \cdot L - N_{Service}$$

FIG. 3 provides an exemplary block diagram illustrating an example STBC transmission scheme in a MIMO system. The example MIMO system in FIG. 3 has two transmitter antennas and one receiver antenna. Data symbols $x_1$, $x_2$, $x_3$ and $x_4$ can be transmitted in a matrix form, e.g., at 301 conjugate versions of data symbols $x_1$ and $x_2$ can be re-transmitted.

When STBC is used, each data stream may have an even number of data symbols. Thus, if $$N_{SYM} = \left\lceil \frac{8 \cdot L + N_{Service} + N_{Tail}N_{Es}}{N_{DBPS}} \right\rceil$$

is even (as shown at 310), the average padding length is half-symbol (e.g., see 315); or, if $$N_{SYM} = \left\lceil \frac{8 \cdot L + N_{Service} + N_{Tail}N_{Es}}{N_{DBPS}} \right\rceil$$

is odd (as shown at 320), then average padding length is 1.5 symbols (e.g., see 325). In the latter case, more than one symbol time may be needed for padding bits transmission.

In HEW, smaller tone spacing may be adopted. Smaller tone spacing can infer longer OFDM symbol length, and the traditional data padding method may encounter lower efficiency. For example, for HEW with ¼ tone spacing, the padding transmission time can be greater than 22 μs, which results in a significant efficiency reduction. In particular, in MIMO transmission with STBC, the average number of padding symbols is doubled to guarantee, an even number of OFDM symbols; thus, the physical layer efficiency can be significantly impaired in 802.11ax.

FIG. 4 provides an exemplary block diagram illustrating an example STBC transmission scheme pre-coded with available channel information (e.g., from the MIMO channel 105 in FIG. 1). The padding scheme can be the same as that in a non-STBC transmission case. For example, for BCC, $$N_{SYM} = \left\lceil \frac{8 \cdot L + N_{Service} + N_{Tail}N_{Es}}{N_{DBPS}} \right\rceil$$

$$N_{PAD} = N_{SYM}N_{DBPS} - 8 \cdot L - N_{Service} - N_{Tail}N_{Es}$$

wherein the parameters are defined in a similar way as discussed above. For LDPC, $$N_{SYM} = \left\lceil \frac{8 \cdot L + N_{Service}}{N_{DBPS}} \right\rceil$$

$$N_{PAD} = N_{SYM}N_{DBPS} - 8 \cdot L - N_{Service}$$

Thus, in this case, the average number of padding is half symbol.

Thus, when $N_{SYM}$ is even, the same STBC transmission scheme as that discussed in FIG. 3 can be used, at 401 (e.g., similar to 310 in FIG. 3). When $N_{SYM}$ is odd, the STBC transmission scheme 405 can be used with pre-coding parameters $V_1$ 406a and $V_2$ 406b, which are obtained based on the availability of channel information, and thus the received data vector y can be represented as:

$$y = [h_1\ h_2]\begin{bmatrix} V_1 \\ V_2 \end{bmatrix}x + n$$

wherein $h_1$ and $h_2$ (407a-b) are the channel coefficients in the 2-transmitter-1-receiver MIMO system. The last padded symbol may be transmitted using one symbol time.

Figure 5:
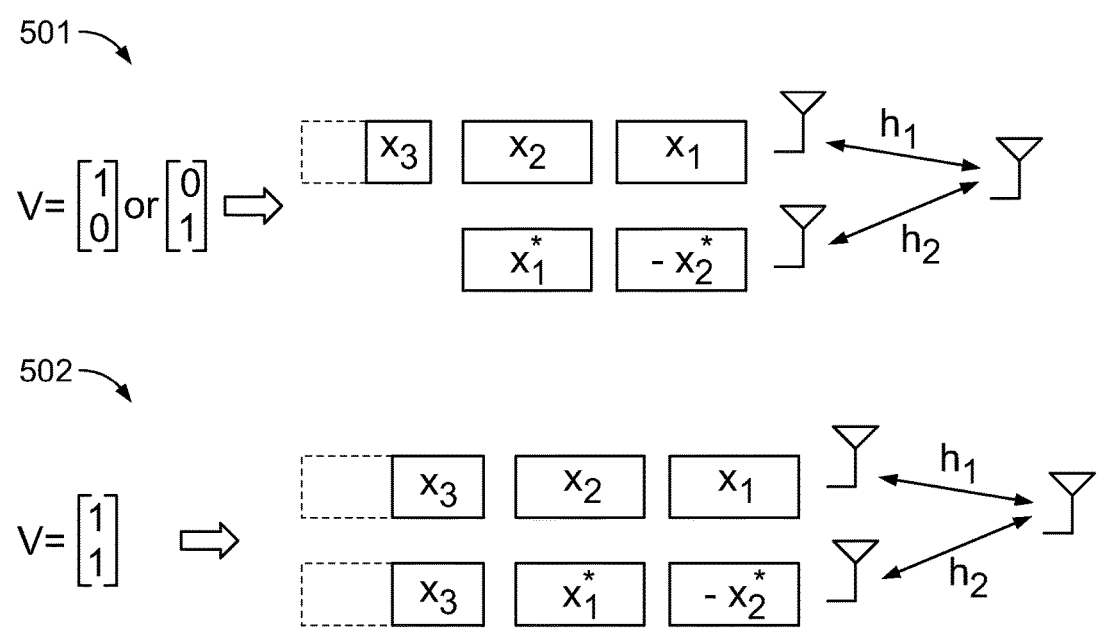
FIG. 5 provides an exemplary block diagram illustrating transmission pre-coding.

FIG. 5 provides an exemplary block diagram illustrating transmission pre-coding. At 501, the last padding symbol can be transmitted using only one transmit antenna, e.g., by setting the pre-coding matrix V as:

$$V = \begin{bmatrix} 1 \\ 0 \end{bmatrix} \text{ or } \begin{bmatrix} 0 \\ 1 \end{bmatrix}$$

The padding symbol transmit antenna can be indicated in the HEW-SIG field (e.g., 201c in FIG. 2), and the transmit power is normalized based on the number of utilized antennas.

Alternatively, in a different implementation at 502, the last padding symbol can be transmitted with some predetermined pre-coder known by both the transmitter and the receiver, for example, by setting the pre-coding matrix V as:

$$V = \begin{bmatrix} 1 \\ 1 \end{bmatrix}$$

Figure 6:
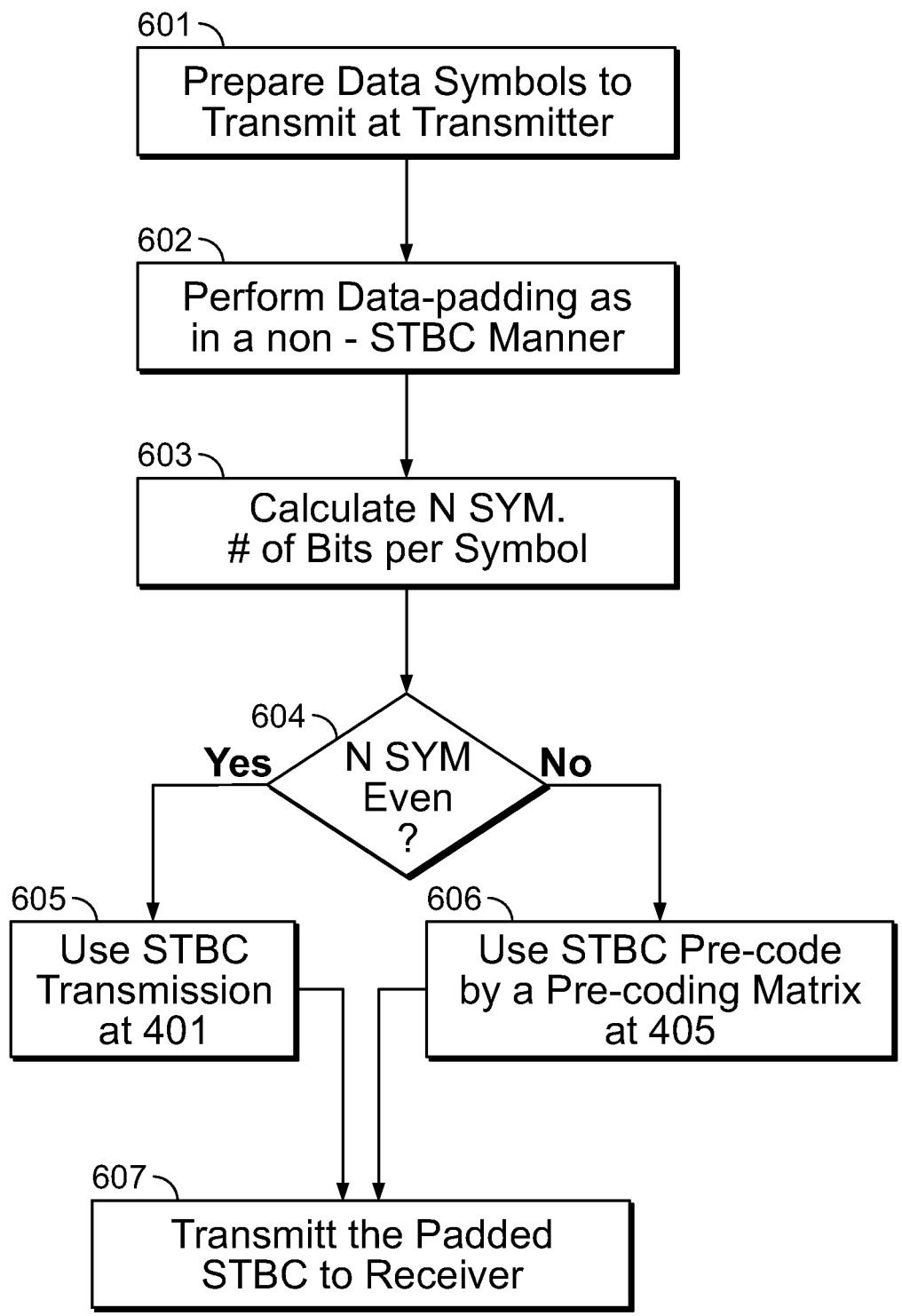
FIG. 6 provides an exemplary flow diagram illustrating transmitting data symbols with a STBC pre-coded with available channel information (e.g., see 405 in FIG. 4).

FIG. 6 provides an exemplary flow diagram illustrating transmitting data symbols with an STBC pre-coded with available channel information (e.g., see 405 in FIG. 4). At 601, a MIMO transmitter module (e.g., see 101 in FIG. 1) may prepare data symbols to transmit. The transmitter may then perform data padding as in a non-STBC case at 602, e.g., as illustrated at 401 in FIG. 4. The transmitter may calculate the number of data symbols $N_{SYM}$ after the data padding at 603, and determine whether $N_{SYM}$ is even or odd at 604. If $N_{SYM}$ is even at 605, the transmitter may use STBC transmission as illustrated at 401 in FIG. 4; otherwise, if $N_{SYM}$ is odd at 606, the transmitter may use STBC pre-coded by a pre-coding matrix, as illustrated at 405 in FIG. 4. The transmitter may then transmit the padded STBC to a wireless channel to reach the receiver at 607.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for transmitting data on a multiple-input-multiple-output (MIMO) channel using a space time block code (STBC), the method comprising:
   obtaining, at a wireless transmitter, a data stream including a plurality of data symbols to transmit;
   determining whether a data symbol from the data stream is a last symbol in the data stream;
   in response to determining that the data symbol is not the last symbol in the data stream, generating a STBC using the data symbol and a next data symbol from the data stream and transmitting the STBC to the MIMO channel; and
   in response to determining that the data symbol is the last symbol in the data stream and that the data stream has an odd number of data symbols, pre-coding only the last data symbol based on a pre-determined pre-coding matrix and transmitting the pre-coded data symbol to the MIMO channel.

2. The method of claim 1, further comprising:
   calculating a number of data symbols from the plurality of data symbols by dividing a total number of data bits based on a number of data bits per every orthogonal frequency-divisional multiplexing (OFDM) symbol.

3. The method of claim 2, further comprising:
   determining whether the calculated number of data symbols from the plurality of data symbols is an even number or an odd number;
   in response to determining that the calculated number of data symbols from the plurality of data symbols is an odd number:
      using a maximum even number of data symbols from the odd number of data symbols to generate a plurality of STBCs in a form of a two-by-two matrix, and
      pre-coding the last symbol using the pre-determined pre-coding matrix.

4. The method of claim 3, further comprising:
   calculating a number of data padding bits based on the calculated number of data symbols; and
   performing data padding for the plurality of data symbols.

5. The method of claim 4, further comprising:
selecting an average padding length for the data padding as half-symbol when the calculated number of data symbols from the plurality of data symbols is an even number; and
selecting an average padding length for the data padding as one and a half symbols when the calculated number of data symbols from the plurality of data symbols is an odd number.

6. The method of claim 1, further comprising:
constructing the pre-coding matrix depending on availability of channel information.

7. The method of claim 1, further comprising:
constructing the pre-coding matrix to indicate that the last data symbol is transmitted using one antenna at the wireless transmitter; and
specifying information of the one antenna for transmitting the last data symbol in a data field of the last data symbol.

8. The method of claim 1, further comprising:
constructing the pre-coding matrix to indicate that the last data symbol is repeatedly transmitted at multiple antennas at the wireless transmitter.

9. The method of claim 8, further comprising:
normalizing transmission power for the last data symbol among the number of the multiple antennas.

10. The method of claim 1, further comprising:
transmitting information relating to the pre-coding matrix to a wireless receiver.

11. A system for transmitting data on a multiple-input-multiple-output (MIMO) channel using a space time block code (STBC), the system comprising:
a wireless transmitter configured to obtain a data stream including a plurality of data symbols to transmit;
control circuitry configured to:
determine whether a data symbol from the data stream is a last symbol in the data stream,
in response to determining that the data symbol is not the last symbol in the data stream, generate a STBC using the data symbol and a next data symbol from the data stream, and
in response to determining that the data symbol is the last symbol in the data stream and that the data stream has an odd number of data symbols, pre-code only the last data symbol based on a pre-determined pre-coding matrix; and
the wireless transmitter being configured to transmit the STBC and the pre-coded data symbol to the MIMO channel.

12. The system of claim 11, wherein the control circuitry is further configured to:
calculate a number of data symbols from the plurality of data symbols by dividing a total number of data bits based on a number of data bits per every orthogonal frequency-divisional multiplexing (OFDM) symbol.

13. The system of claim 12, wherein the control circuitry is further configured to:
determine whether the calculated number of data symbols from the plurality of data symbols is an even number or an odd number;
in response to determining that the calculated number of data symbols from the plurality of data symbols is an odd number:
use a maximum even number of data symbols from the odd number of data symbols to generate a plurality of STBCs in a form of a two-by-two matrix, and
pre-code the last symbol using the pre-determined pre-coding matrix.

14. The system of claim 13, wherein the control circuitry is further configured to:
calculate a number of data padding bits based on the calculated number of data symbols; and
perform data padding for the plurality of data symbols.

15. The system of claim 14, wherein the control circuitry is further configured to:
select an average padding length for the data padding as half-symbol when the calculated number of data symbols from the plurality of data symbols is an even number; and
select an average padding length for the data padding as one and a half symbols when the calculated number of data symbols from the plurality of data symbols is an odd number.

16. The system of claim 11, wherein the control circuitry is further configured to:
construct the pre-coding matrix depending on availability of channel information.

17. The system of claim 11, wherein the control circuitry is further configured to:
construct the pre-coding matrix to indicate that the last data symbol is transmitted using one antenna at the wireless transmitter; and
specify information of the one antenna for transmitting the last data symbol in a data field of the last data symbol.

18. The system of claim 11, wherein the control circuitry is further configured to:
construct the pre-coding matrix to indicate that the last data symbol is repeatedly transmitted at multiple antennas at the wireless transmitter.

19. The system of claim 18, wherein the control circuitry is further configured to:
normalize transmission power for the last data symbol among the number of the multiple antennas.

20. The system of claim 11, wherein the wireless transmitter is further configured to:
transmit information relating to the pre-coding matrix to a wireless receiver.

* * * * *